US 10,041,478 B2

(12) United States Patent
Spencer

(10) Patent No.: US 10,041,478 B2
(45) Date of Patent: Aug. 7, 2018

(54) VERTICAL AXIS WINDMILL

(71) Applicant: George Auther Spencer, Athens, TX (US)

(72) Inventor: George Auther Spencer, Athens, TX (US)

(*) Notice: Subject to any disclaimer, the term of this patent is extended or adjusted under 35 U.S.C. 154(b) by 277 days.

(21) Appl. No.: 15/051,164

(22) Filed: Feb. 23, 2016

(65) Prior Publication Data

US 2017/0241403 A1 Aug. 24, 2017

(51) Int. Cl.
*F03D 13/20* (2016.01)
*F03D 3/06* (2006.01)

(52) U.S. Cl.
CPC ............ *F03D 13/20* (2016.05); *F03D 3/067* (2013.01); *F05B 2240/218* (2013.01); *Y02E 10/74* (2013.01)

(58) Field of Classification Search
CPC ... F03D 3/00; F03D 3/005; F03D 3/02; F03D 3/067; F03D 3/06; F03D 3/061; F03D 3/062; F03D 3/068; F03D 13/20; Y02E 10/74
See application file for complete search history.

(56) References Cited

U.S. PATENT DOCUMENTS

| | | | | |
|---|---|---|---|---|
| 1,036,109 A * | 8/1912 | Haslinger | ............. | B64C 11/006 416/116 |
| 3,793,530 A * | 2/1974 | Carter | ..................... | F03D 3/067 290/44 |
| 8,684,817 B2 * | 4/2014 | Walker | .................... | G07F 17/32 463/16 |
| 2008/0292460 A1 * | 11/2008 | Kuo | ........................ | F03D 3/067 416/140 |
| 2010/0109337 A1 * | 5/2010 | Wang | ...................... | F03D 3/067 290/55 |
| 2011/0068581 A1 * | 3/2011 | Lowery | .................... | F03D 3/067 290/55 |
| 2011/0133474 A1 * | 6/2011 | Haar | .......................... | F03D 3/06 290/55 |
| 2012/0047976 A1 * | 3/2012 | Vanderhye | ............. | B01D 53/62 71/61 |
| 2012/0121414 A1 * | 5/2012 | Steinberg | ................ | F03D 3/067 416/17 |

FOREIGN PATENT DOCUMENTS

WO   WO 2006131935 A1 * 12/2006 ............. F03D 3/067

\* cited by examiner

*Primary Examiner* — Logan Kraft
*Assistant Examiner* — Elton Wong
(74) *Attorney, Agent, or Firm* — Patent Law of Virginia, PLLC; Brian J. Teague

(57) ABSTRACT

A vertical axis windmill comprises three or more frames rotatable in unison about a substantially vertical axis and a plurality of airfoils hingedly affixed to each frame. Each airfoil is able to swing away from its respective frame in a first direction from a closed position to an open position and not able to swing away from its respective frame in a second direction from the closed position.

26 Claims, 13 Drawing Sheets

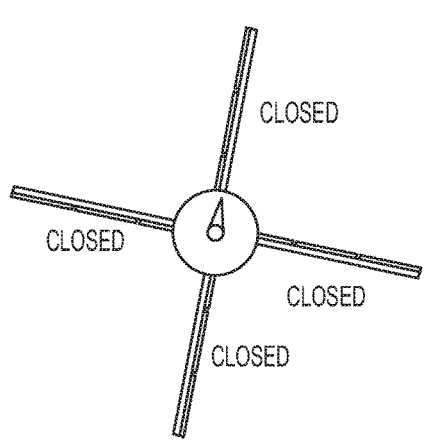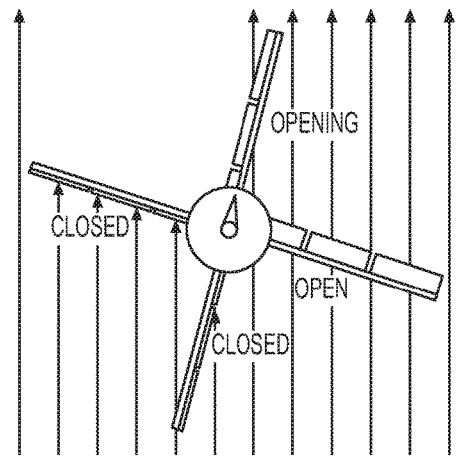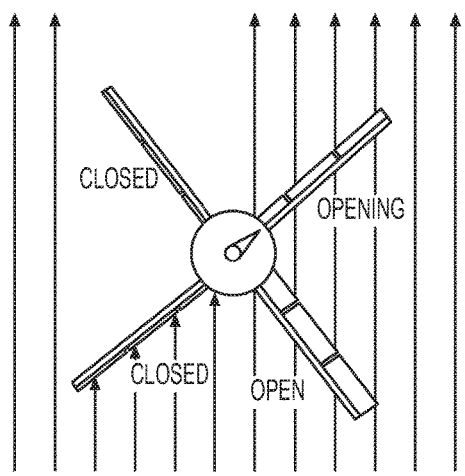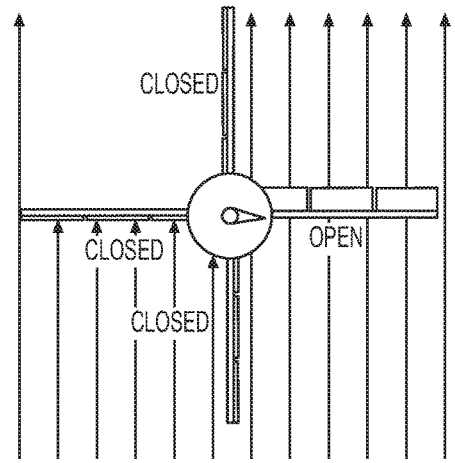
FIG. 13

VERTICAL AXIS WINDMILL

FIELD OF THE INVENTION

The present invention relates generally to windmills, and more specifically to vertical axis windmills.

BACKGROUND

Wind turbines are located in wind corridors, on mountains and near mountain passes where higher surface winds exist. Windmills/turbines operate below 1,000 feet above ground level (agl) and are subject to surface wind restrictions. Because of this loss in wind speed, windmill farms design for taller and taller turbine blades. Presently, megawatt (MW) wind turbine blades may reach in excess of 500 feet above ground level. Both large MW and small kilowatt (KW) wind turbines are typically designed for air speeds from 15 miles per hour (mph) to 30+ mph, and create little or no energy when winds are below 10 mph.

For wind power to have a broader rural use and application the windmill needs to produce large quantities of energy while utilizing average local wind conditions. In one exemplary locality (McKinney, Tex.) over a two-year period (2011-2012), the highest wind speed was about 13 mph, the lowest wind speed was about 6 mph, and the overall average wind speed was 9 mph. However, the overall average wind speed of 9 mph is exceeded for only 5 months out of the year. In such an exemplary locality, for the windmill to be effective throughout the year; the windmill needs to operate with winds as low as 6 mph.

A simple construction and ease of maintenance gives the windmill a broader appeal.

A windmill design is heretofore needed that can effectively and efficiently operate in 9 mph or less, surface wind conditions. The vertical axis windmill of the following disclosure accomplishes the above and other objectives, and overcomes at least the above-described disadvantages of conventional windmills.

BRIEF SUMMARY

In one embodiment of the invention, a vertical axis windmill comprises three or more frames rotatable in unison about a substantially vertical axis and a plurality of airfoils hingedly affixed to each frame. Each airfoil is able to swing away from its respective frame in a first direction from a closed position to an open position and not able to swing away from its respective frame in a second direction from the closed position. The second direction is opposite the first direction.

The windmill may further comprise a central axle rotating in unison with the three or more frames. The three or more frames may be affixed to each other such that the vertical axis is formed where the three or more frames are affixed to each other. The windmill may further comprise a frame support affixed to a portion of a bottom edge of each of the three or more frames, such that the central axle is affixed to the frame support.

A proximal edge of each of the three or more frames may be affixed to the central axle such that the central axle forms the vertical axis. The windmill may further comprise a frame support affixed to a portion of a bottom edge of each of the three frames, such that the central axle extends through the frame support.

Two or more of the frames may be connected side edge to side edge to form an effective longer horizontal frame. Two or more of the frames may be connected top edge to bottom edge to form an effective taller vertical frame.

Each airfoil may be hingedly affixed to its respective frame at a top edge of each airfoil. Each airfoil may be hingedly affixed to its respective frame at a side edge of each airfoil.

The windmill may further comprise one or more airfoil adjustable stops per frame for limiting one or more of the respective plurality of airfoils from reaching the closed position. The one or more airfoil adjustable stops may be selectively variable such that a desired distance of the one or more of the respective plurality of airfoils from the closed position is selectively variable, thereby forming a selectively variable opening. The one or more airfoil adjustable stops may comprise a plurality of airfoil adjustable stops that are (a) each controlled independently or (b) controlled in unison.

The windmill may further comprise one or more counterbalance mechanisms coupled to one or more of the plurality of airfoils to reduce a force needed to swing the one or more of the plurality of airfoils from the closed position to the open position. The one or more counterbalance mechanisms each may comprise a counterbalance spring and/or a counterbalance weight and/or an electromagnet.

The windmill may further comprise one or more electrical generators selectively engageable with the axle to selectively generate electricity when the axle rotates and/or one or more hydraulic pumps selectively engageable with the rotating axle to selectively generate hydraulic pressure when the axle rotates. The one or more electrical generators may comprise two or more generators of different generating capacity and/or voltage types.

The windmill may further comprise one or more substantially vertical rotatable wheels, each wheel rotatably affixed to a support beam projecting downward from a respective one of the frames and contacting a non-moving surface below the frames such that the one or more rotatable wheels rotate when the frames rotate. The windmill may further comprise one or more electrical generators, each of the one or more electrical generators selectively engageable with a corresponding one of the rotatable wheels to selectively generate electricity when engaged and when the corresponding one of the rotatable wheels rotates.

The windmill may further comprise a frame support affixed to a portion of a bottom edge of each of the three or more frames and one or more substantially vertical rotatable wheels. Each wheel may be rotatably affixed to a support beam projecting downward from the frame support and contacting a non-moving surface below the frames such that the one or more rotatable wheels rotate when the frames rotate. The windmill may further comprise one or more electrical generators. Each of the one or more electrical generators may be selectively engageable with a corresponding one of the rotatable wheels to selectively generate electricity when engaged and when the corresponding one of the rotatable wheels rotates.

The windmill may further comprise a stationary base supporting the central axle and three or more horizontal rotatable support wheels. The base may comprise a circular perimeter wall. Each wheel may be rotatably affixed to a support beam projecting downward from a respective one of the frames and may contact the stationary base perimeter wall such that the wheels rotate around the stationary base perimeter when the frames rotate.

The windmill may further comprise a frame support affixed to a portion of a bottom edge of each of the three or more frames, a stationary base supporting the central axle, and three or more horizontal rotatable support wheels. The base may comprise a circular perimeter wall. Each wheel may be rotatably affixed to a support beam projecting downward from the frame support and may contact the stationary base perimeter wall such that the wheels rotate around the stationary base perimeter when the frames rotate.

The windmill may further comprise an elevated platform having an opening defined in a center thereof and a plurality of legs supporting the platform above a surface upon which the windmill sits. The platform may be positioned such that a central axis of the windmill extends through the opening in the center of the platform. Each of the plurality of legs may be vertically adjustable. The elevated platform may comprise two or more concentric circular tracks.

Each of the frames may define a plurality of openings. Each of the plurality of airfoils may be affixed to its respective frame at a corresponding one of the plurality of openings. Two or more of the plurality of airfoils may be affixed to their respective frame at a corresponding one of the plurality of frame openings.

The windmill may further comprise one or more support cables affixed to one frame and at least one other frame. The windmill may further comprise a rolling cable support comprising a support beam affixed to the one or more support cables and a wheel rotatably affixed to the support beam.

The plurality of frames may be spaced substantially equidistantly from each other.

BRIEF DESCRIPTION OF THE SEVERAL VIEWS OF THE DRAWING(S)

The foregoing summary, as well as the following detailed description of the disclosure, will be better understood when read in conjunction with the appended drawings. For the purpose of illustrating the disclosure, there are shown in the drawings embodiments which are presently preferred. It should be understood, however, that the disclosure is not limited to the precise arrangements and instrumentalities shown. In the drawings:

FIGS. 10-13 illustrate various operating characteristics of a vertical axis windmill, in accordance with embodiments of the present invention.

DETAILED DESCRIPTION

Figure 1:
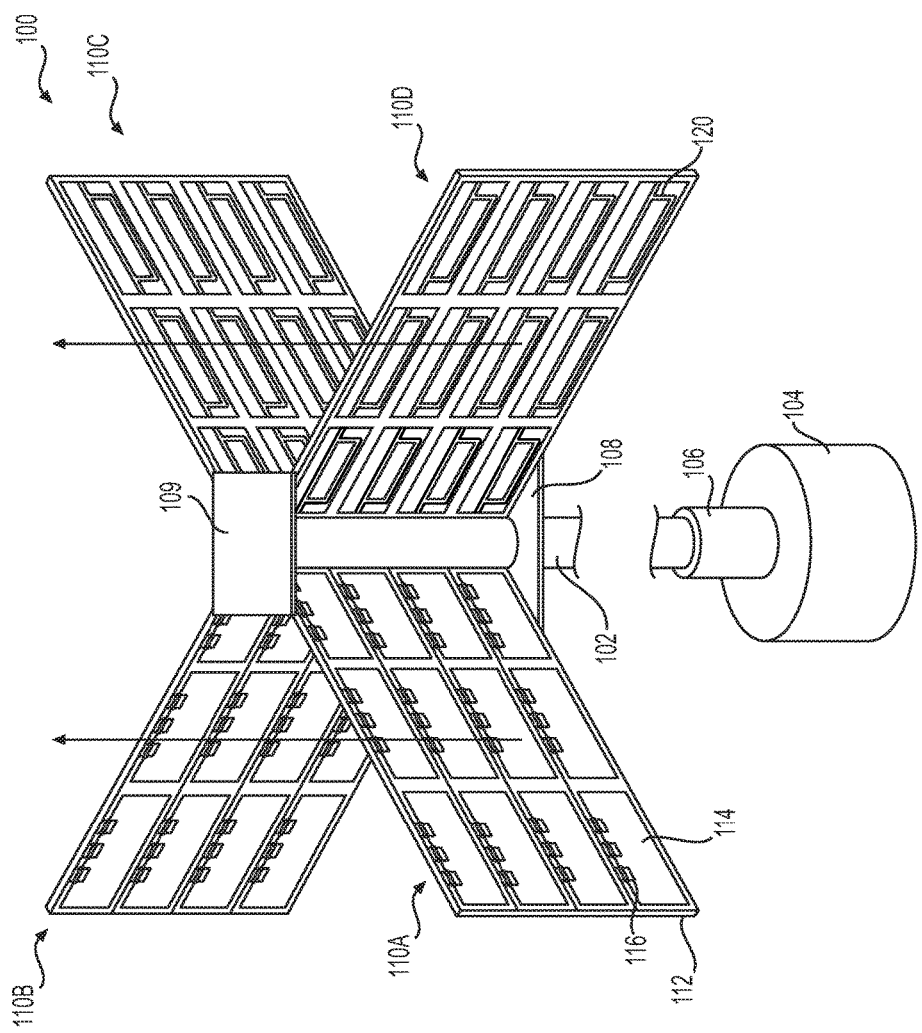
FIG. 1 is a perspective view of a vertical axis windmill, in accordance with embodiments of the present invention.
Figure 2:
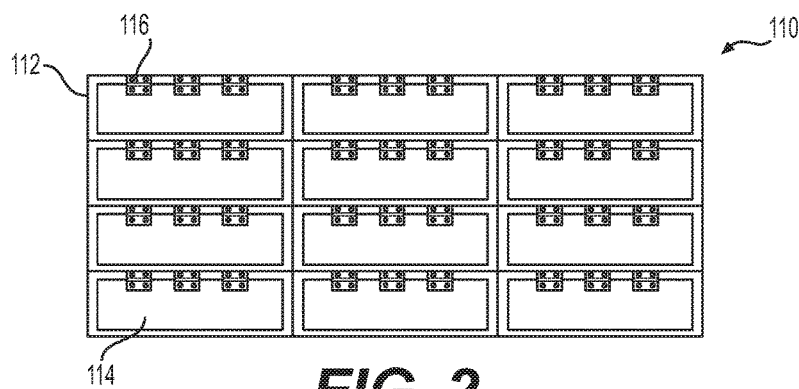
FIG. 2 is a front view of an airblade of the windmill of FIG. 1.

The terminology used herein is for the purpose of describing particular embodiments only and is not intended to be limiting of the invention. The words "lower," "bottom," "upper," and "top" designate directions in the drawings to which reference is made. The words "inwardly," "outwardly," "upwardly" and "downwardly" refer to directions toward and away from, respectively, the geometric center of the device, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

Embodiments of the invention comprise a vertical axis windmill. A vertical axis windmill of embodiments of the invention can effectively and efficiently operate in typical 9 mph normal surface wind conditions.

Referring now to FIGS. 1-7, a vertical axis windmill 100 comprises three or more airblades (four are illustrated) 110A-D rotatable in unison about a substantially vertical axis. Each airblade 110A-D comprises a frame 112 and a plurality of airfoils 114 hingedly affixed to each frame 112 via hinges 116. Advantageously, each airfoil 114 is able to swing away from its respective frame 112 in a first direction from a closed position to an open position, and each airfoil 114 is not able to swing away from its respective frame 112 in a second direction (opposite the first direction) from the closed position. The windmill 100 of FIG. 1 is configured to rotate clockwise when viewed from above.

As the airblades rotate about the vertical axis, one or more airblades are on the "power" side (i.e., rotating with the wind) and one or more airblades are on the "drag" side or "back" side (i.e., rotating against the wind). How many airblades are on the power side and how many are on the drag side at any point in time depends on how many airblades the windmill has and the rotational position of the airblades. In the four airblade windmill 100 of FIG. 1 with the wind direction as indicated by the arrows (the wind is substantially horizontal to the ground) and the airblades positioned as illustrated in FIG. 1, the airblades 110A and 110B are on the power side and the airblades 110C and 110D are on the drag side (this will of course change as the windmill rotates). As the airblades rotate, airblades 110B and 110D will become parallel to the wind direction, airblade 110A will be the only airblade on the power side, and airblade 110C will be the only airblade on the drag side. As the airblades continue to rotate, airblades 110D and 110A will be on the power side and airblades 110B and 110C will be on the drag side. As the rotation continues, airblades 110A and 110C will become parallel to the wind direction, airblade 110D will be the only airblade on the power side, and airblade 110B will be the only airblade on the drag side. As the airblades continue to rotate, airblades 110C and 110D will be on the power side and airblades 110A and 110B will be on the drag side. This pattern will continue as long as the windmill is rotating.

When no wind is present, the airfoils 114 may hang down against their respective frames (i.e., in a closed position). Alternatively, as described further below, a counterbalance mechanism may apply a counterbalance force to some or all of the airfoils to push the airfoils away from their respective frames into a partially open (but still predominantly closed) position when no wind is present.

As the wind pushes against the airblades on the power side (i.e., airblades 110A and 110B in the positions illustrated FIG. 1), the wind applies pressure to the hinged airfoils 114. If the airfoils on the power side airblades are partially open due to a counterbalance mechanism, the wind will force those airfoils closed. With the airfoils on the power side airblades closed and with the wind still applying pressure to those airfoils, the airfoils are unable to swing away from the wind, and thus remain in their closed positions. With all of the airfoils 114 of airblades 110A and 110B in their closed positions, the wind resistance of airblades 110A and 110B is maximized and the airblades 110A and 110B are able to fully take advantage of the wind power to rotate the airblades.

The wind also pushes against the airblades on the drag side (i.e., airblades 110C and 110D in the positions illustrated FIG. 1) and applies pressure to the hinged airfoils 114 of airblades 110C and 110D. If the airfoils 114 were fixed and not hinged, then significant drag would result from the pressure applied by the wind to the airfoils of airblades 110C and 110D. That drag would counteract some or all of the rotational force being applied against power side airblades 110A and 110B by the wind. However, the airfoils on the airblades 110C and 110D are able to swing away from the wind. Thus, when the wind pushes against the airfoils of airblades 110C and 110D, some or all of the airfoils open (the airfoils on the drag side airblades may already have been at least partially open due to a counterbalance mechanism) and allow wind to pass through the airblades 110C and 110D, thereby reducing drag on the airblades 110C and 110D.

As the windmill rotates and one of the airblades moves from the power side to the drag side, some or all of the airfoils of that airblade will open due to the counterbalance force and/or the wind pressure to automatically reduce the drag on that airblade. As one of the airblades moves from the drag side to the power side, some or all of the airfoils of that airblade will close due to the wind pressure to automatically increase the wind resistance on that airblade.

In summary, the airfoils on the power side airblades automatically close to increase wind resistance and the airfoils on the drag side automatically open to reduce drag.

Figure 6:
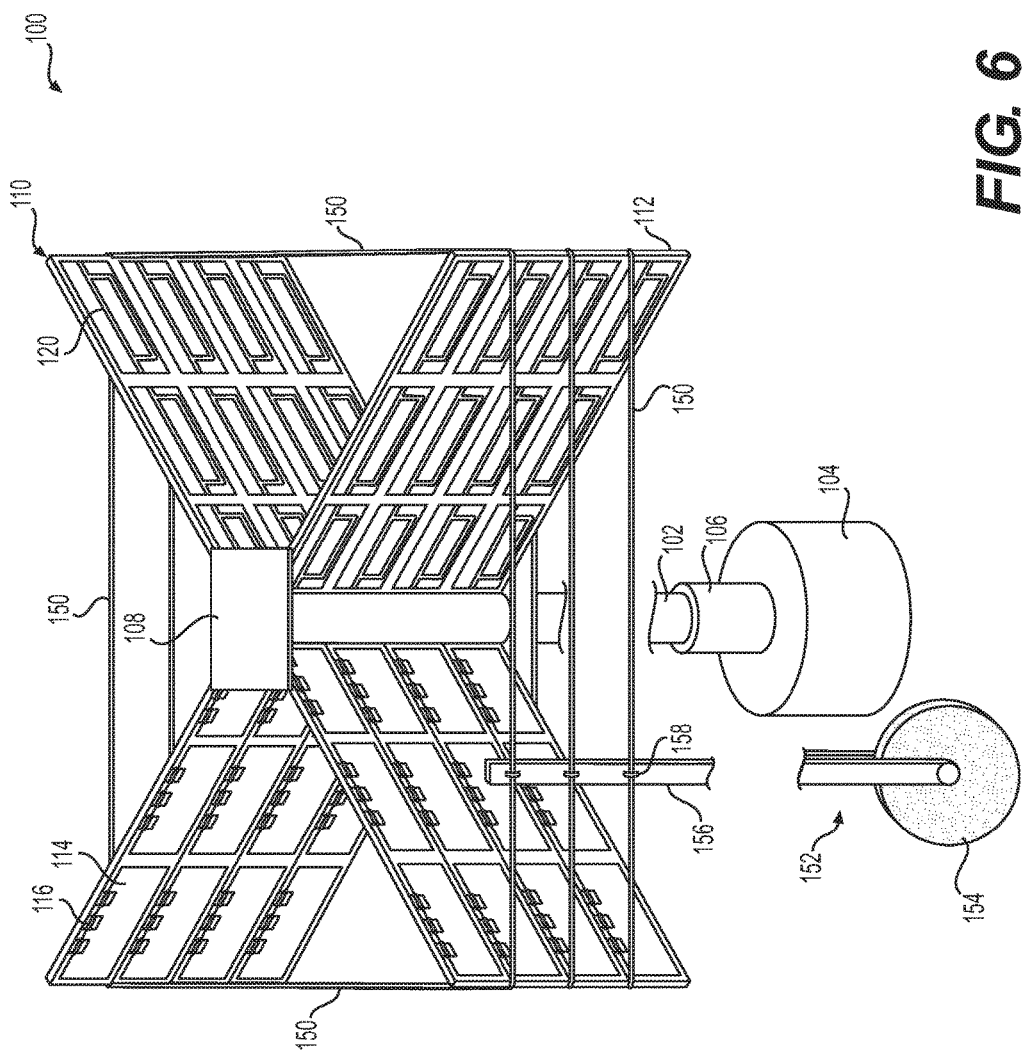
FIG. 6 is a perspective view of the windmill of FIG. 1, illustrating additional features.

While four airblades are illustrated in FIGS. 1 and 6, a windmill of embodiments of the invention may comprise any suitable number of airblades. Typically, at least three airblades are desirable. Regardless of the number of airblades, the airblades will typically be spaced equidistantly from each other.

As illustrated in FIG. 1, the windmill 100 comprises a frame support 108 affixed to a portion of a bottom edge of each of the frames and a top support 109 affixed to a portion of the top edge of each of the frames. The base and top supports 108, 109 may comprise sturdy, rigid plates (e.g., steel plates), as illustrated. Alternatively, the base and top supports may comprise sturdy, rigid beams or a frame (not illustrated).

As illustrated in FIG. 1, the proximal edges of the frames 112 may be affixed to a rotatable central axle 102, such that the central axle 102 forms the vertical central axis of the windmill. The frames 112 and central axle 102 rotate in unison. In such an embodiment, the central axle 102 typically extends through the frame support 108. In an alternative embodiment (not illustrated), the proximal edges of the frames 112 may be affixed to each other, such that the vertical central axis of the windmill is formed where the frames are affixed to each other. In such an alternative embodiment, the frames may be mounted on a rotatable central axle (such as by affixing the underside of the frame support 108 to the rotatable central axle) and the frames and central axle still rotate in unison.

The windmill 100 comprises a stationary base 104 supporting the central axle 102 and the frames 112. The base 104 may comprise a circular perimeter wall, as illustrated. A collar or sleeve 106 may surround a portion of the central axle. The sleeve 106 is affixed to the base 104 and does not rotate.

Any suitable mechanism may be used to prevent the airfoils from swinging away from the frame in the same direction as the wind when on the power side. Some portion of the frame may block the airfoils from swinging away from the frame in the same direction as the wind when on the power side. Alternatively, one or more tabs extending from the frame may block the airfoils from swinging away from the frame in the same direction as the wind when on the power side.

The windmill 100 comprises one or more airfoil adjustable stops 120 per frame. In the illustrated embodiment, there is one adjustable stop 120 per airfoil. The adjustable stops 120 are movable to limit the airfoils from reaching the closed position. That is, the adjustable stops 120 may hold the airfoils open (fully or partially).

It may be desirable to hold open some or all of the airfoils on one or more of the airblades to spill or waste extra air. Holding open some or all of the airfoils on an airblade to spill or waste extra air is termed feathering. The purpose of feathering is to maintain a constant speed and torque over a wide range of varying wind speeds. When the windmill first starts rotating, all of the airfoils may be allowed to fully close (non-feathered). (The airfoils on the drag side airblade (s) will still be allowed to open to reduce drag, but none of the airfoils will be held open.) This non-feathered condition typically continues until all generators are producing full power, at which time the windmill typically starts feathering some or all of the airfoils to maintain constant speed and torque. This feathering is important as it is easy to over speed the generators when the wind speed is too high. The windmill is typically designed to accommodate a maximum power wind speed (i.e., the wind speed at which the generators are producing full power). For example, a windmill of embodiments of the invention may be designed with a maximum power wind speed of 20 mph. In such an embodiment, the airfoils will be feathered any time the wind speed exceeds 20 mph. The higher the wind speed, the more airfoils that may need to be feathered. Because of this feathering, the windmill will effectively see (e.g.,) a 40 mph wind as a 20 mph wind due to the feathering of unneeded wind speeds. Another benefit of feathering is that, by selecting a pattern for the airfoils to be held open (fully or partially), the bending forces on an airblade can be controlled.

Another reason to control the rotational speed of the windmill by feathering is that the distal ends of the airblades should not travel faster than the speed of the wind. If the distal ends of the airblades travel faster than the wind, the relative wind effectively reverses and thereby causes a braking action.

Figure 3:
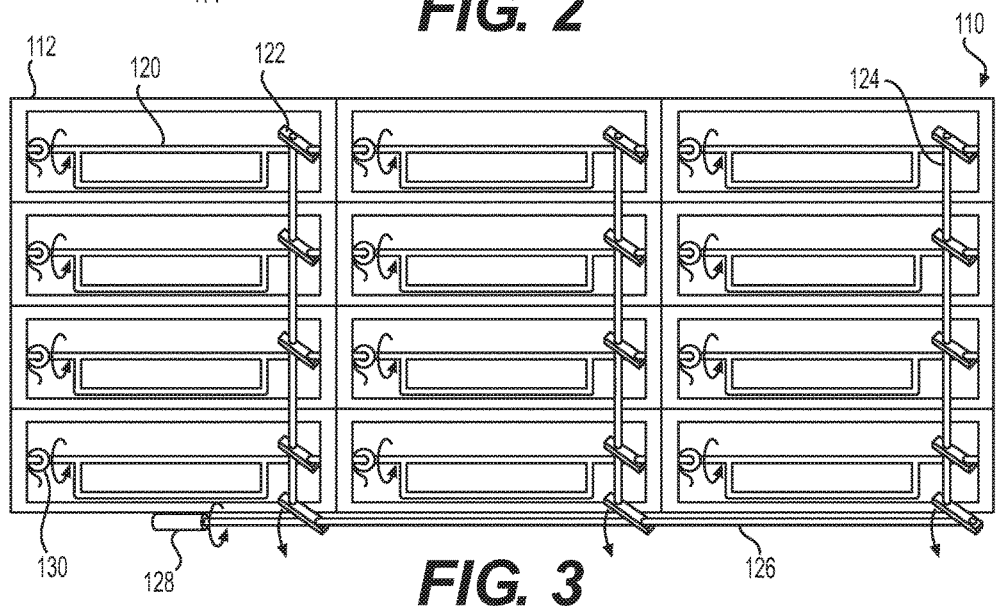
FIG. 3 is a rear view of an airblade of the windmill of FIG. 1.
Figure 4:
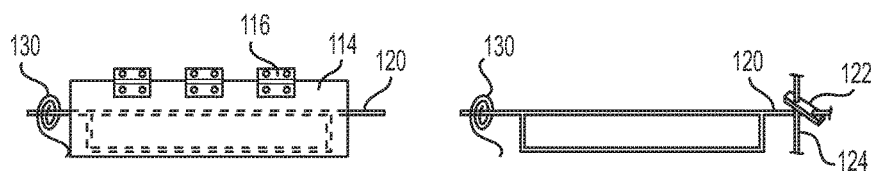
FIG. 4 is a front view of an airfoil and an adjustable airfoil stop of the windmill of FIG. 1.

Referring now to FIGS. 3 and 4, the adjustable stops 120 of one of the airblades are illustrated in more detail, in accordance with an embodiment of the invention. The stops in FIGS. 3 and 4 are in the closed position (i.e., vertically aligned with the frame 112). As seen in FIG. 3, each stop 120 comprises a rotatable horizontal bar with a rectangular bar or plate extending therefrom (or any other suitable structure for holding an airfoil open). Each stop 120 is positioned within a corresponding opening in the frame 112 and is able to open one corresponding airfoil. The rotatable horizontal bar of each stop is attached to a corresponding stop lever 122. Each stop lever 122 is attached to a vertical gang post 124. Each vertical gang post 124 is affixed to a horizontal gang post 126 via a stop lever 122. The horizontal gang post 126 is affixed to a reversible gear motor 128 (or any other suitable mechanism for rotating horizontal gang post 126 in either direction).

When it is desired to push and hold open the airfoils, the gear motor 128 rotates in the direction shown by the arrow in FIG. 3, causing the horizontal gang post 126 to rotate and thereby also rotating downward the stop levers 122 affixed thereto (as indicated by the arrows in FIG. 3). When the stop levers 122 affixed to the horizontal gang post 126 rotate downward, the vertical gang posts 124 are pulled downward, which also pulls downward the stop levers 122 affixed thereto. When the stop levers 122 affixed to the vertical gang posts 124 rotate downward, the horizontal bars of the stops rotate (as indicated by the arrows in FIG. 3) and the rectangular bars of the stops swing upward to push and hold open the corresponding airfoils.

When it is desired to allow the airfoils to close, the gear motor 128 rotates in the opposite direction, causing the horizontal gang post 126 to rotate and thereby also rotating upward the stop levers 122 affixed thereto. When the stop levers 122 affixed to the horizontal gang post 126 rotate upward, the vertical gang posts 124 are pushed upward, which also pushes upward the stop levers 122 affixed thereto. When the stop levers 122 affixed to the vertical gang posts 124 rotate upward, the horizontal bars of the stops rotate and the rectangular bars of the stops swing downward to allow the corresponding airfoils to close.

By controlling how far upward the rectangular bars of the stops 120 swing, the amount of opening of the airfoils can be controlled. In a fully open position, an airfoil projects outward 90 degrees from the frame. In a fully closed position, an airfoil is vertically aligned with the frame. An airfoil may be opened partially at any variable increment between fully open and fully closed.

The mechanism for opening and closing the adjustable stops may be configured such that all of the stops on a particular airblade are controlled in unison, controlled individually, or controlled in groups. In a preferred embodiment of the invention, the airfoils on each airblade are controlled in vertical groups. The mechanism for opening and closing the adjustable stops shown in FIG. 3 is configured such that all of the airfoils are controlled in unison.

The vertical axis windmill of embodiments of the invention may further comprise one or more counterbalance mechanisms coupled some or all of the airfoils. The counterbalance mechanism reduces the force required for the wind to open the airfoils on the drag side airblades. In a no wind condition, the airfoils do not need to be fully closed (typically, 50% to 80% closed will be acceptable); that is, the counterbalance mechanism may hold the airfoils partially open when there is no wind. When wind is present, the wind pressure against the airfoils on the power side airblades will cause the airfoils to close. The counterbalance mechanism may comprise, for example, a counterbalance spring, a counterbalance weight, and/or an electromagnet. In the embodiment of the invention illustrated in FIGS. 3 and 4, a counterbalance spring 130 is affixed to each of the adjustable stops 120 and affixed to or contacting each corresponding airfoil 114.

Figure 5:
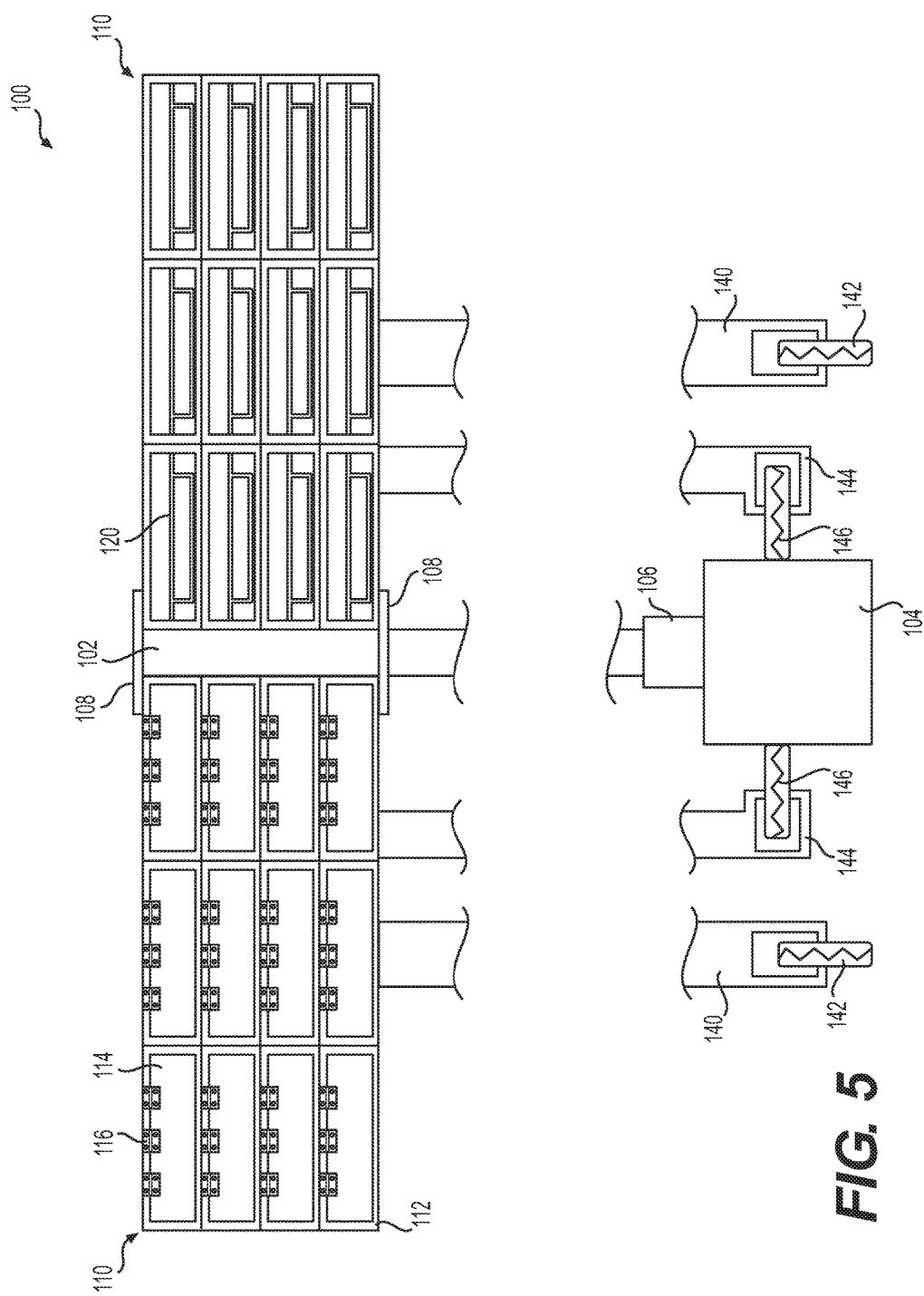
FIG. 5 is a front view of the windmill of FIG. 1, illustrating additional features.

Referring now to FIG. 5, additional features of the windmill 100 of embodiments of the invention are illustrated. FIG. 5 illustrates support mechanisms that may be affixed to the airblades at one or more positions along the length of the airblade, to support the airblades as they rotate. As seen in FIG. 5, one or more support beams 140 (two are shown in FIG. 5—one on each illustrated airblade) may be affixed to and project downward from one or more of the airblades (typically, if such supports are desirable on any of the airblade, the supports will be desirable on all of the airblades). One or more substantially vertical wheels 142 are rotatably affixed at the distal end of each support beam. The wheel contacts a non-moving surface below the frames (e.g., the ground or a support platform as described below) such that the wheels rotate when the airblades rotate. Any suitable number of support beams and wheels may be affixed to each airblade (one for each airblade is shown in FIG. 5). The number of support beams and wheels will typically depend on the length of the airblades. The support beams may be affixed at any suitable position along the airblades. For example, it may be desirable to have a support beam affixed at or near the distal end of each airblade, and it may be desirable to have a support beam affixed approximately equidistant between the distal end of each airblade and the central axle. The support beams may have any suitable length, depending (for example) on how far above the ground the airblades are and whether the wheels contact the ground or a support platform. It may be desirable, for example, to have the airblades high enough above the ground to be able to drive a support vehicle under the airblades. In such an example, either the support beams would need to be long enough to accomplish this or a support platform would need to be used.

As further seen in FIG. 5, a support beam 144 may be affixed to and project downward from each of the airblades, at or near the proximal end of each airblade. One or more substantially horizontal wheels 146 are rotatably affixed at the distal end of each support beam. The wheels contact the perimeter wall of the base 104 such that the wheels rotate around the base perimeter when the airblades rotate. In this regard, the support beams and wheels provide lateral support to the windmill. In alternative embodiments (not illustrated), a support beam may be affixed to and project downward from the frame support 108 or from the central axle 102. In these alternative embodiments, there may not necessarily be one support beam per airblade, but there will likely still be multiple support beams evenly spaced about the windmill.

Referring now to FIG. 6, additional features of the windmill 100 of embodiments of the invention are illustrated. FIG. 6 illustrates torque cables 150 connected to each of the airblades. The torque cables distribute the airblade's torqueing power equally to all airblades, thereby increasing the airblade's bending strength by the number of airblades. While FIG. 6 illustrates three torque cables, any suitable number of torque cables may be used. While FIG. 6 illustrates the torque cables attached at the distal ends of the airblades, the torque cables may be attached to the airblades other points along the length of the airblades, including at multiple points along the length of the airblades. As the torque cables might be quite long, the torque cables may be prone to sag. As an example, if a four airblade windmill comprises airblades that are 200 feet long, then, the airblade-to-airblade support cable at the distal edge would be about 1.5 times the airblade length or about 300 feet. Vertical cable supports 152 may be used to reduce sagging. The vertical cable supports 152 illustrated in FIG. 6 comprise a support beam 156 and a wheel 154 rotatably affixed to the support beam 156 (alternatively, a skid (not illustrated) may be affixed to the support beam instead of a wheel). The cables are affixed to the support beam 156 at attachment points 158. The wheel 154 enables the cable supports 152 to readily travel with the rotation of the windmill. FIG. 6 illustrates only one cable support for simplicity. Typically, at least one cable support will be used between every pair of adjacent airblades, and possibly multiple cable supports will be used between every pair of adjacent airblades for large windmills.

Figure 7:
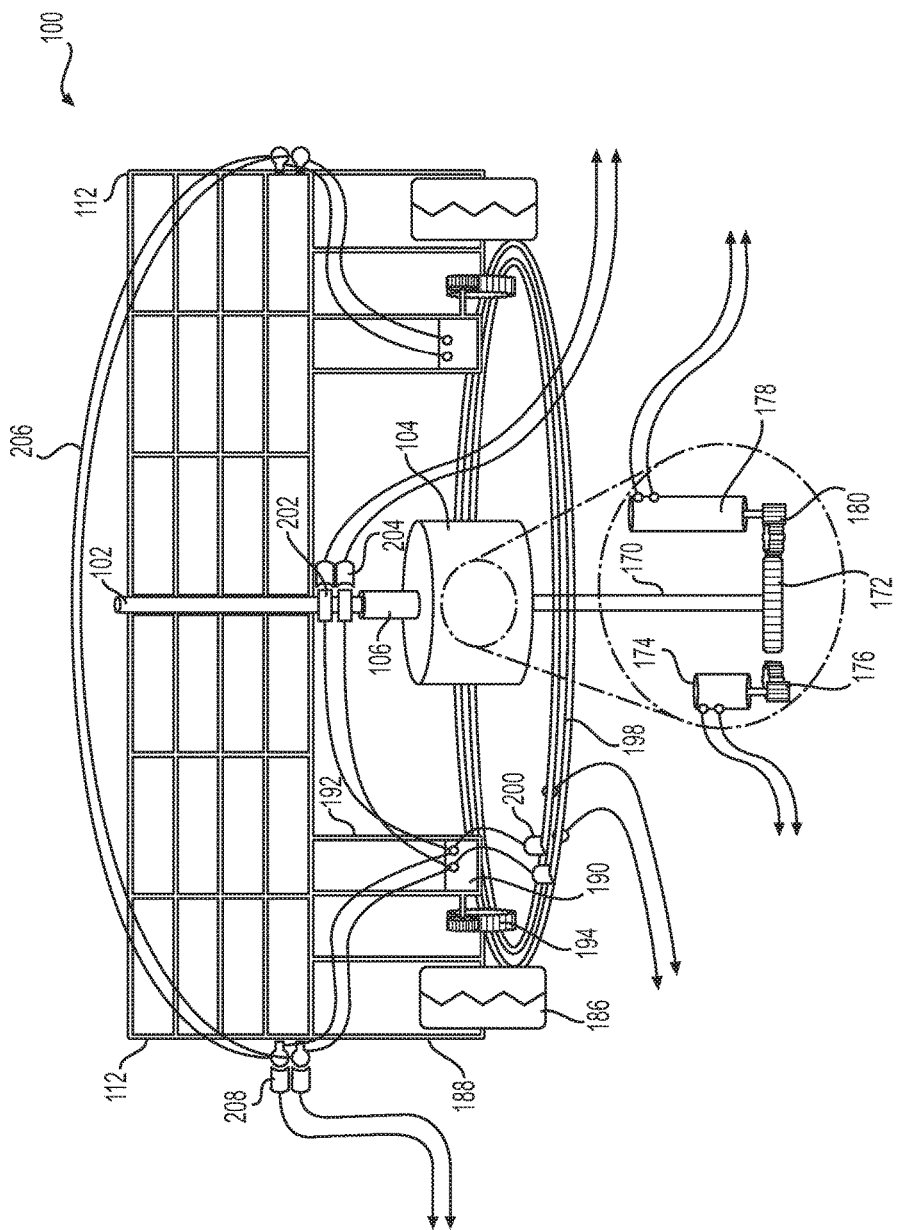
FIG. 7 is a front view of the windmill of FIG. 1, illustrating additional features.

Referring now to FIG. 7, additional features of the windmill 100 of embodiments of the invention are illustrated. FIG. 7 illustrates the power generating system of the windmill 100. The windmill 100 comprises one or more electrical generators (two generators 174, 178 are illustrated) selectively engageable with the central axle 102 (either directly or via a generator drive axle 170) to selectively generate electricity when the axle rotates. The generators 174, 178 may be located in the base 104 as illustrated.

The electrical generators may comprise two or more generators of different generating capacity and/or voltage types (illustrated by the different sizes of generators 174 and 178 in FIG. 7). Even if the generators have the same generating capacity, it may still be desirable to have two or more generators. As an example, in a windmill of embodiments of the invention, it may be desirable to have one megawatt (MW) of electrical generating capacity. However, a single one MW generator would have a very large starting torque. In order to start generating and take advantage of low wind speeds, multiple generators could be used that could be individually brought on line as the wind speed increased. Instead of using a single one MW generator, four 250 kilowatt (KW) generators or eight 125 KW generators could be used. This not only allows the windmill to start producing energy at lower wind speeds, it also increases reliability as one generator can fail and the windmill would still be able to produce power.

The generators are equipped with a clutch (which may be, for example, magnetic freewheeling pulley/sprocket/gear, etc.) to reduce the windmill's startup drag. This helps with low wind conditions while a generator is waiting to be brought on line. Idling also reduces bearing wear, as the generator isn't turning. One or more gear boxes (indicated in FIG. 7 by gears 172, 176, 180) may be used to selectively engage the generator(s).

When the windmill is beginning to rotate, there are several factors, such as weight, bearing drag, and generator back loading, that causes the windmill to resist initial turning. By idling the gear box (neutral position) when the windmill is just beginning to rotate, drag can be reduced. Once the windmill is rotating, the generator gear box can be engaged, then the generator's freewheeling pulley can be engaged, then an electrical load can be applied to the generator. In this way, drag caused by the generator(s) is incrementally increased as the rotational speed of the windmill can handle the increased drag.

In addition to or instead of the generators, one or more hydraulic pumps (not illustrated) may be selectively engageable (such as via a power take off) with the rotating axle to selectively generate hydraulic pressure when the axle rotates. The hydraulic pumps may be selectively engageable in a manner similar to the generators.

In addition to the generator(s) described above that may be located in the base 104, one or more generators may be affixed to each of one or more of the airblades to use the motion of the airblades relative to the ground (or some other non-moving surface) to generate electricity. Similar to the support beams 140 and support wheels 142 illustrated in FIG. 5, one or more support frames 188 (two are shown in FIG. 7—one on each illustrated airblade) may be affixed to and project downward from one or more of the airblades. One or more substantially vertical drive wheels 186 are rotatably affixed at the distal end of each support frame 188. The wheel contacts a non-moving surface below the frames (e.g., the ground or a support platform as described below) such that the wheels rotate when the airblades rotate. The wheels 186 may be in the form, for example, of a tire wheel, roller bearing, or a tooth gear bearing that rolls on a toothed track. The assembly may track both vertically and horizontally to compensate for track and windmill variances.

The support frames 188 and drive wheels 186 may also provide vertical support to the airblades, similarly to the support beams 140 and support wheels 142 illustrated in FIG. 5. In this regard, the function of the support beams 140 and support wheels 142 and the function of the support frames 188 and drive wheels 186 may be combined into a unitary structure.

For each support frame 188 and drive wheel 186, a generator support frame 192 projects downward from the corresponding airblade and supports an electrical generator 190. (Alternatively, the support frames could be configured to support a generator.) Each electrical generator 190 is selectively engageable with a corresponding one of the drive wheels 186 to selectively generate electricity when engaged and when the windmill is rotating (and therefore the drive wheel is rotating). The electrical generator 190 is selectively engageable with a corresponding one of the drive wheels 186 by way of a disconnect idler gear and a gear box (illustrated in FIG. 7 by gears 194). The disconnect idler gear enables the generator to be disengaged to allow the windmill to startup under minimum load. The gear box provides a gear ratio to step up the drive wheel revolutions per minute (rpm) to the required generator speed (typically 2,000 to 8,000 rpm). The ratio of the gear box is a function of the input rpm versus the needed output rpm. The input rpm is determined by the radius of the drive wheel. If the drive wheel is located at or near the distal end of the airblade, the drive wheel will travel at one-half the speed of the wind or slower; therefore the circumference of the track is not a factor. If the drive wheel is not located near the distal end of the airblade (such as a second drive wheel located midway along the length of the airblade), then the ratio would need to be changed to reflect the loss in feet/second (ft/sec) of the drive wheel (i.e., the ratio would need to be doubled). Putting the drive wheel the distal end of the airblade, where the feet per minute movement is the largest, reduces the step-up ratio needed to achieve generation speeds.

In one exemplary embodiment of the invention, the maximum power air speed is 20 mph or 30 ft/sec, the maximum airblade speed is 15 ft/sec, the maximum generator rpm is 8,000 rpm, and the drive wheel has a one foot circumference (four inch diameter). In such an example, the drive wheel is turning at 15 revolutions per second or 900 rpm. The required drive gear ratio is 900 rpm:8,000 rpm, or a 1:9 ratio.

Any suitable number of support frames, drive wheels, generators, and generator support frames may be affixed to each airblade (one for each airblade is shown in FIG. 7). The support frames, drive wheels, generators, and generator support frames may be affixed at any suitable position along the airblades, although having the drive wheels at the distal ends of the airblades may be desirable as discussed above.

The support frames for the drive wheels may have any suitable length, depending (for example) on how far above the ground the airblades are and whether the wheels contact the ground or a support platform.

Each drive wheel 186 must be in constant contact with a surface to consistently drive its generator. If the drive wheels contact the ground, the ground should be leveled and preferably paved with concrete or asphalt which will help stabilize the surface in wet weather. The drive wheels can be on shocks to automatically raise and lower to compensate for an uneven surface. The drive wheels can contact an elevated platform, as described below and illustrated in FIG. 9.

Because the generators 190 are rotating on the airblades, slip rings (or some other suitable mechanism) are necessary to transfer the electricity generated by the airblade generators to external stationary wiring. FIG. 7 shows three possible locations for slip rings. Slip rings 198 are on the ground (or other surface under the windmill), and transfer electricity via spring-loaded brushes or skid plates 200. Slip rings 202 are on the central axle 102 and rotate in unison with the central axle, and transfer electricity via spring-loaded brushes or skid plates 204. Slip rings 206 go around the perimeter of the windmill (only half of the slip rings 206 are shown for simplicity), and transfer electricity via spring-loaded brushes or skid plates 208. Slip rings 206 can also function as torque cables (described above). With slip rings that go around the perimeter of the windmill, flexible cabling may be needed as the slip rings may not be circular (especially if the slip rings are also functioning as torque cables). Multiple slip rings may be needed. For example, two slip rings are needed for DC voltage and three to six slip rings for AC voltage. Multiple generators with the same voltage may be tied to the same slip rings. Multiple sets of slip rings may be used to output electricity from multiple generators with different voltages.

Figure 8:
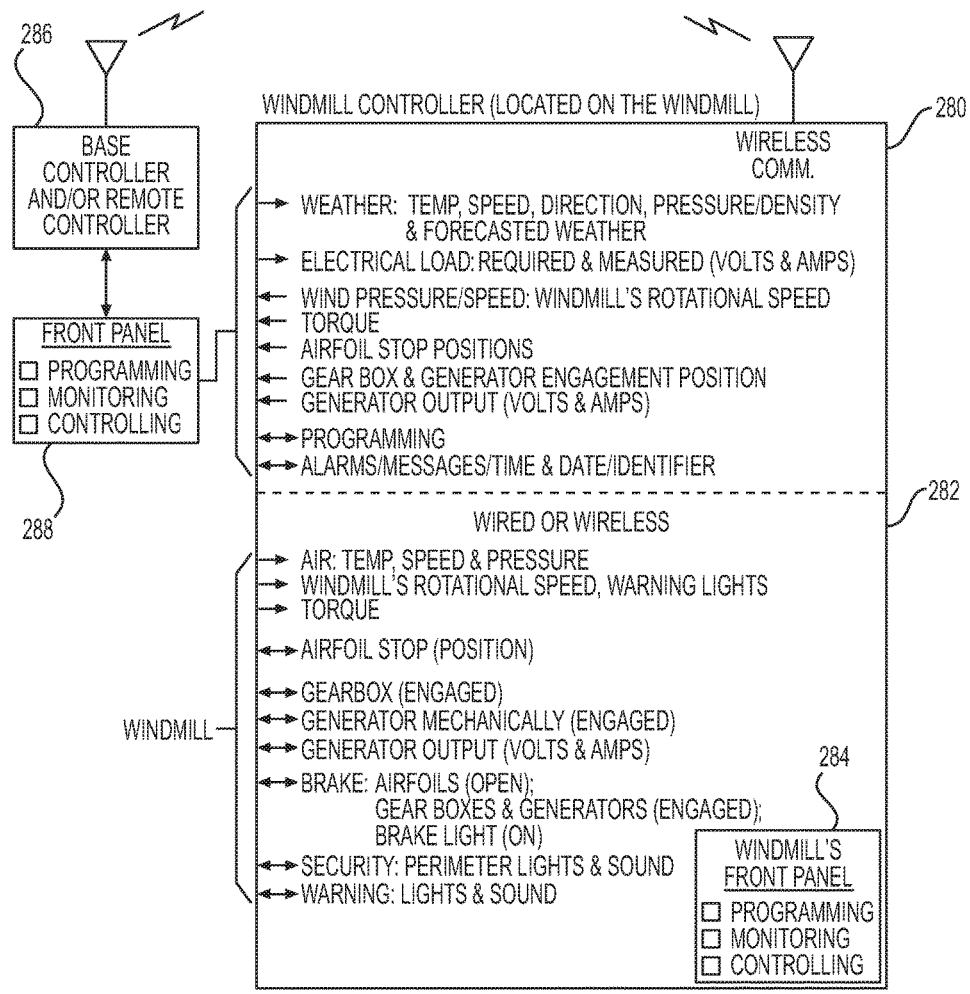
FIG. 8 is a functional block diagram of a control system of a vertical axis windmill, in accordance with embodiment of the present invention.

Referring now to FIG. 8, a control system for a vertical axis windmill is illustrated. Many different features and functions of the windmill may be controlled in many different ways. FIG. 8 illustrates only one possible control configuration. In the control system of FIG. 8, a control 280 is located on or near the windmill. The controller 280 receives inputs and information from a variety of different sensors and devices and sends outputs to a variety of different devices. Some possible inputs and information received by and/or sent from the controller 280 are indicated in block 280. Some possible input and output devices and information are shown in block 282. The controller 280 may comprise a microprocessor, dedicated or general purpose circuitry (such as an application-specific integrated circuit or a field-programmable gate array), a suitably programmed computing device, or any other suitable means for controlling the operation of the windmill. The control system may comprise a front panel 284 located at or near the windmill. The front panel 284 may comprise, for example, a monitor and keyboard.

A controller 286 may also be located remote from the windmill to control the windmill remotely. The remote controller 286 may communicate with the local controller 280 via any suitable wired or wireless communication scheme. A front panel 288 may be co-located with the remote controller 286. The front panel 288 may comprise, for example, a monitor and keyboard.

Figure 9:
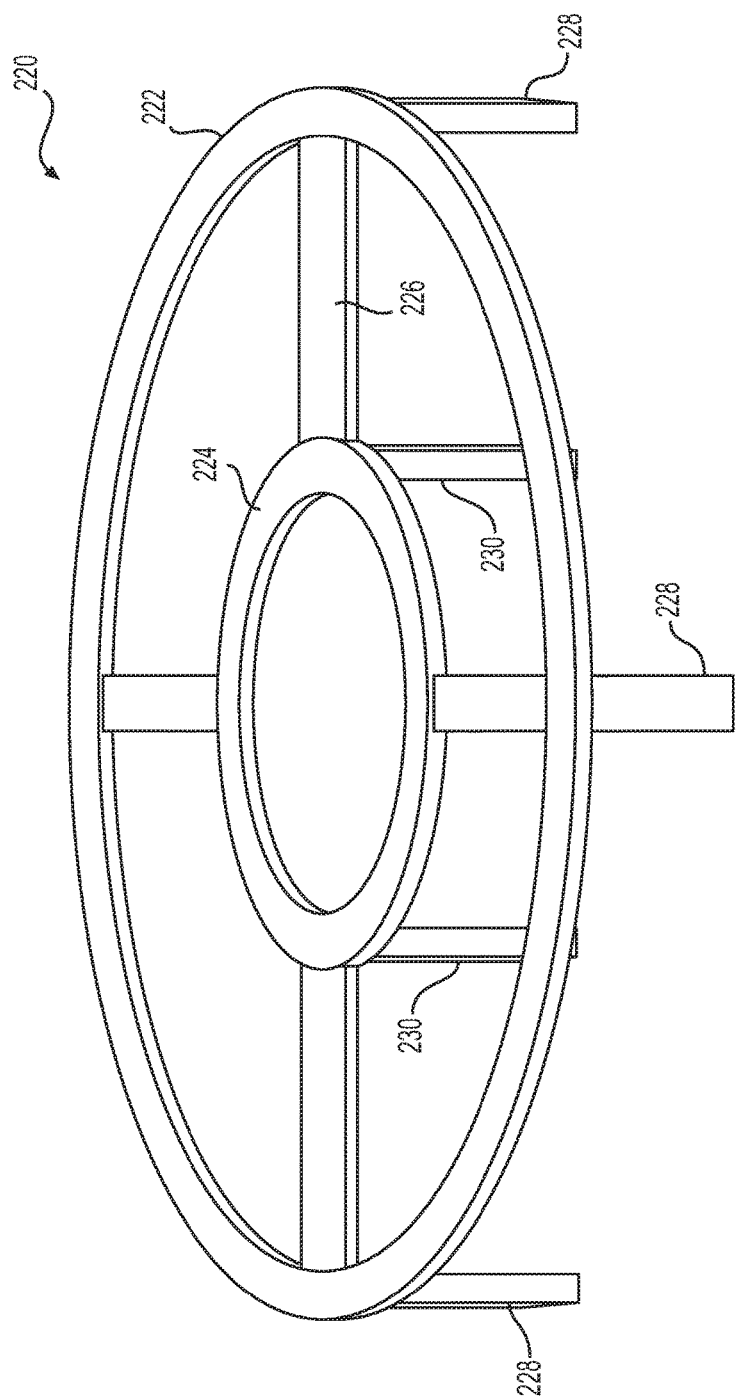
FIG. 9 is a perspective view of an elevated platform that may be used with a vertical axis windmill, in accordance with embodiments of the present invention.

As mentioned above, it may be desirable to have an elevated platform or track for the support wheel and/or the generator drive wheels to contact. Such an elevated platform may reduce or eliminate the need to level the ground beneath the windmill. This may be especially desirable when a portable version of the windmill may be assembled in locations in which it is difficult, impossible, or otherwise undesirable to do the necessary site work to level the ground. Referring now to FIG. 9, an elevated platform 220 comprises an outer ring 222 and a concentric inner ring 224, joined by horizontal beams 226. An opening is defined by the inner ring 224. The platform is positioned around the windmill such that the central axis of the windmill extends through the opening in the center of the platform. A plurality of legs 228 support the outer ring 22 and a plurality of legs 230 support the inner ring 224. Each of the plurality of legs may be vertically adjustable, such as by being telescoping or by pivoting up and down (similar to outriggers on a backhoe) to allow the platform to be setup on uneven ground. The elevated platform may comprise two or more concentric circular tracks, as illustrated. In such an embodiment, the support wheels may contact one track and the generator drive wheels may contact the other track. Alternatively, the elevated platform may comprise a single, much wider circular track (not illustrated) that both the support wheels and the generator drive wheels may contact. If intended for use with a portable version of the windmill, the elevated platform may be readily disassembled for transport.

Figure 10:
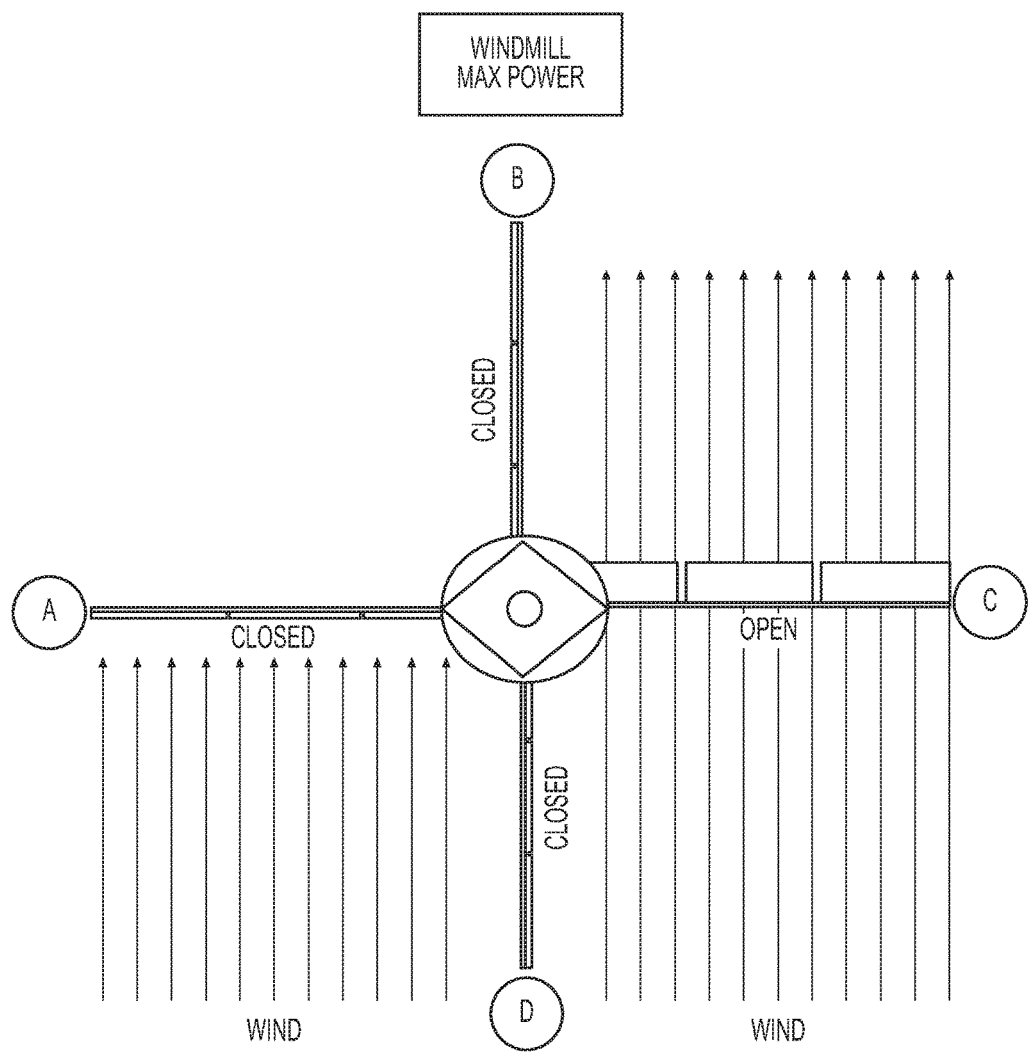
Figure 11:
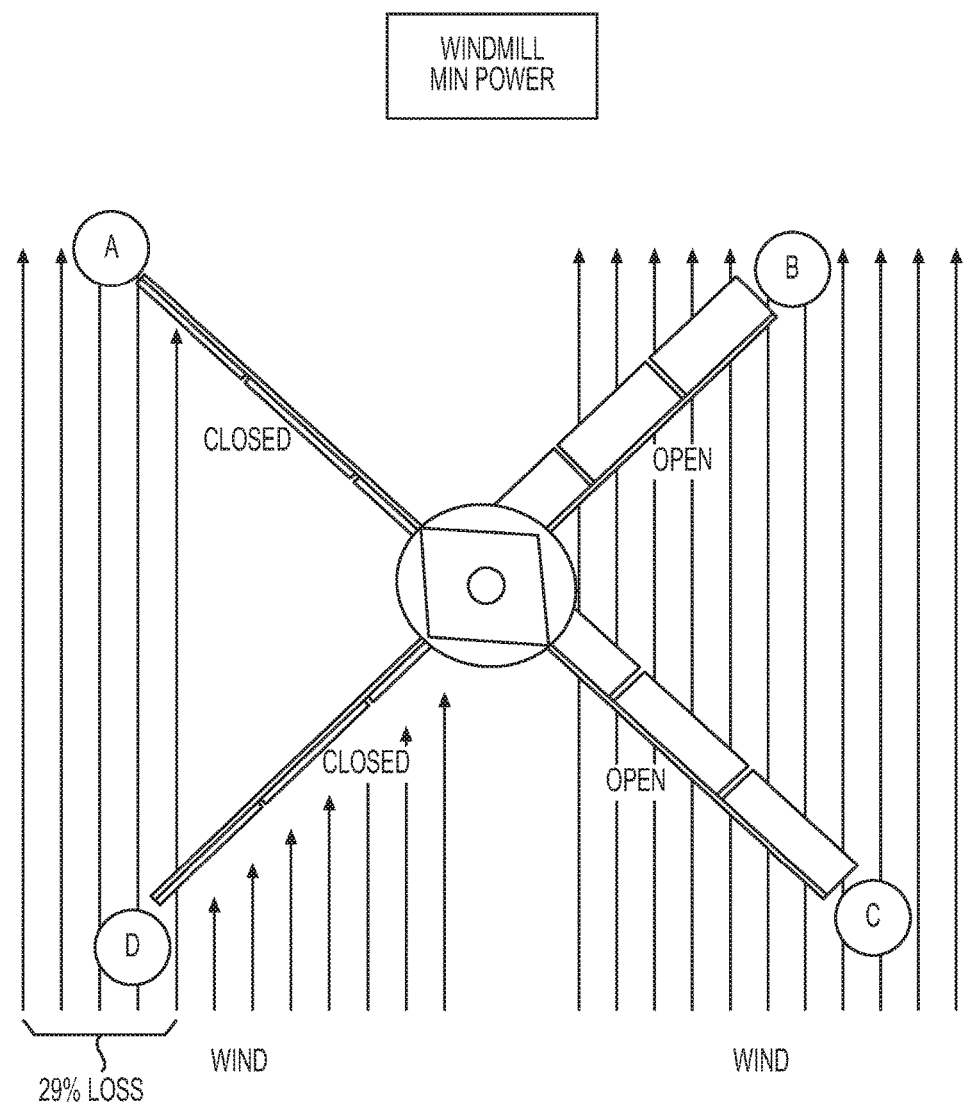

Referring now to FIGS. 10 and 11, the state of the airfoils of each airblade versus the wind direction is illustrated. If the top edges of FIGS. 10 and 11 are considered to be 0°, then airblade A is at 270° and is the power side airblade in FIG. 10. The airfoils on airblade A are closed to increase or maximize wind resistance. Airfoil C is the drag side airblade, and the airfoils on airblade C are open to reduce or minimize drag. Airfoils B and D are parallel to the wind. The airfoils on airblades B and D may be closed or partially open (they are shown closed). As the windmill rotates clockwise, such as to the position shown in FIG. 11, airblade D rotates to the power side and its airfoils are closed or remain closed, while airblade B rotates to the drag side and its airfoils are opened or remain open. Airblade A is still on the power side and its airfoils remain closed, while airblade C is still on the drag side and its airfoils remain open.

When the airblades are in the position shown in FIG. 11 (i.e., 45° to the wind), the effective length of the airblades relative to the wind is reduced by 29% (for a windmill with four airblades) as compared to the position in FIG. 10 (i.e., perpendicular to the wind). This in effect causes the power output to vary (slows speed and reduces torque). If a constant speed and torque are desired, then the desired power output is designed for the position shown in FIG. 11. The rotational speed of the windmill is then controlled by opening some of the airfoils on the power side airblades. Specifically, when an airblade reaches position D in FIG. 11, some airfoils are opened up (possibly sequentially) to maintain speed and torque until halfway between the D and A positions in FIG. 11, then the airfoils are closed again (possibly sequentially) until the airblade reaches the A position in FIG. 11.

Figure 12:
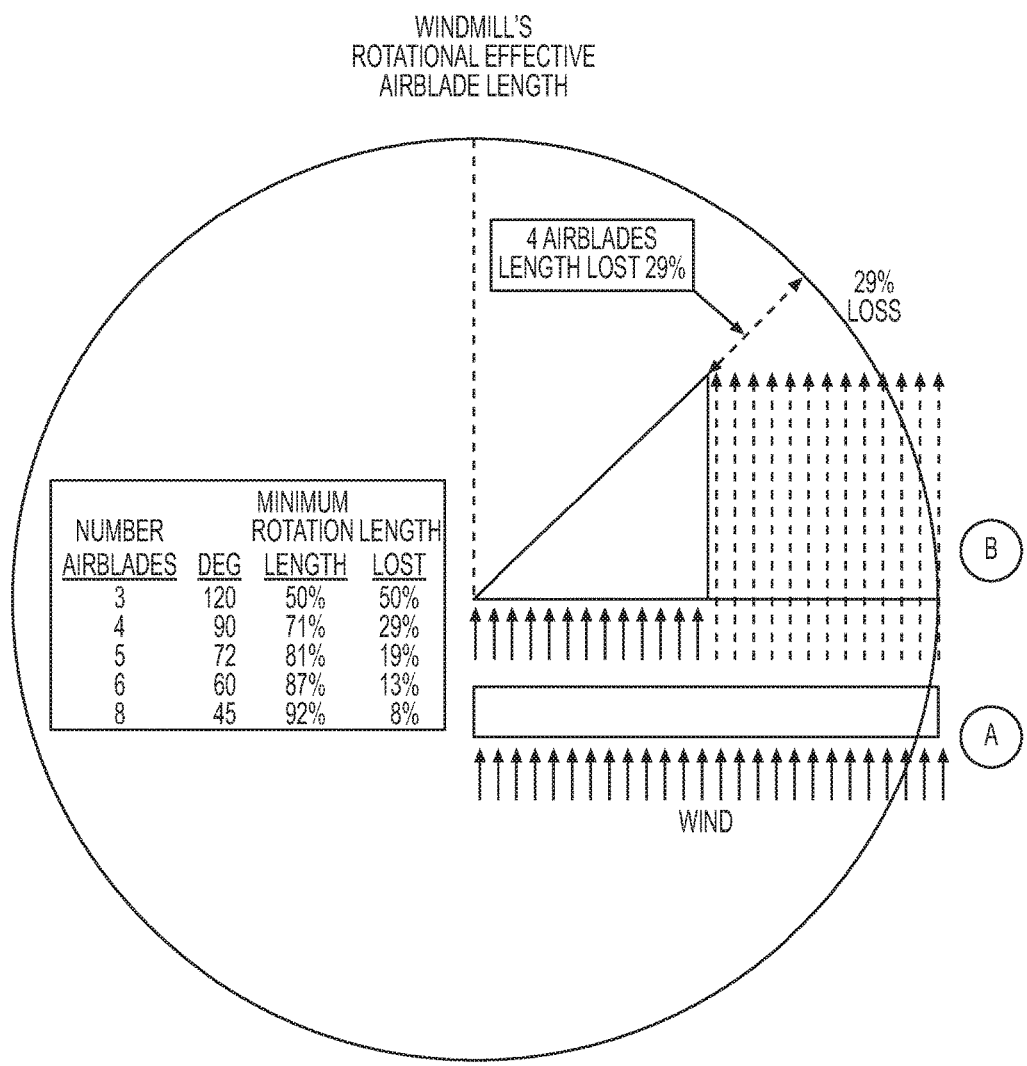

Referring now to FIG. 12, the effective rotational length of the airblades as they rotate is illustrated. As mentioned above, when an airblade is at 45° to the wind (position B in FIG. 12), the effective length of the airblade relative to the wind is reduced as compared to when the airblade is perpendicular to the wind (position A in FIG. 12). The amount of this reduction varies depending on the number of airblades that the windmill has. This is shown in the table on the left side of FIG. 12, for windmills with three to eight blades. For a windmill with four airblades, an airblade that is 100 feet long at 45° to the wind would produce about the same power as an airblade that is 71 feet long 90° to the wind. (This disregards any wraparound air currents or other factors.) The effective length lost is a direct reflection on power, speed and torque (i.e., a 29% variance for a four airblade windmill), resulting in power ripple. So increasing the number of airblades reduces power ripple, but at a cost of increased weight, cost, and complexity. So, one factor in selecting the number of airblades for a vertical axis windmill of embodiments of the invention is how much power ripple is tolerable. Note, however, that power ripple can be reduced by varying the airfoil openings, as discussed above.

FIG. 13 illustrates an example of the initial movements of the windmill as it begins rotating, and the status of the airfoils. As discussed above, the generators can be disengaged when the wind is not blowing and the windmill is not rotating, to reduce starting drag. The generators can be engaged in stages as the wind speed increases and the rotational speed of the windmill increases. For each generator, the generator gear box can be engaged, then the generator's freewheeling pulley can be engaged, then an electrical load can be applied to the generator. This engagement can be performed sequentially for each of the generators. Table 1 below illustrates one example of sequencing the engagement of the generators (four generators in this example).

TABLE 1

| FIG. 13 Position | Wind MPH | Wind ft/sec | Rotation ft/sec | Generator Status | Generator # 1 | 2 | 3 | 4 |
|---|---|---|---|---|---|---|---|---|
| Position 0 | 0 | 0 | 0 | Gear Engaged | no | no | no | no |
|  |  |  |  | Gen Clutch | no | no | no | no |
|  |  |  |  | Electrical Load | no | no | no | no |
| Position 1 | 1 | 1.5 | 0.7 | Gear Engaged | yes | no | no | no |
|  |  |  |  | Gen Clutch | yes | no | no | no |
|  |  |  |  | Electrical Load | no | no | no | no |
| Position 2 | 2 | 3 | 1.5 | Gear Engaged | yes | yes | no | no |
|  |  |  |  | Gen Clutch | yes | no | no | no |
|  |  |  |  | Electrical Load | yes | no | no | no |
| Position 3 | 3 | 4.5 | 2.3 | Gear Engaged | yes | yes | yes | no |
|  |  |  |  | Gen Clutch | yes | yes | no | no |
|  |  |  |  | Electrical Load | yes | yes | no | no |
|  | 8 | 11.7 | 5.9 | Gear Engaged | yes | yes | yes | yes |
|  |  |  |  | Gen Clutch | yes | yes | yes | yes |
|  |  |  |  | Electrical Load | yes | yes | yes | yes |

A windmill of embodiments of the invention may comprise one or more air pressure sensors. Each air pressure sensor may comprise a movable plate hingedly coupled to a base, a biasing mechanism outwardly biasing the movable plate from the base, and (a) a sensor for determining a position of the movable plate relative to the base or (b) a sensor for determining a force applied at the biasing mechanism. An accordion baffle or the like may span from the movable plate to the base to protect the biasing mechanism and sensor. The air pressure sensor can be located on or near the airblades, preferably on the distal edge. Multiple sensors can be located on each airblade to determine the air speed at different vector positions and heights. The air pressure sensors are a direct indicator of wind speed and may be translated to distance per time (feet per second or minute). This information may be used to determine how much generator loading can be applied to achieve the best energy generation, normally thought to be one-half the speed of the wind. Therefore, if the wind is traveling at 15 feet per second (about 10 mph), the windmill would be loaded by increasing or decreasing drag from the generators to achieve a rotational outer radius speed of 7.5 feet per second.

If the airfoils become frozen in the closed position, the windmill may become subject to wind damage as the airfoils cannot be opened to reduce side thrust. The windmill's controller can be linked to a thermometer and/or a weather broadcast which predicts such things as rain, ice, sleet, snow, high gusting winds, lightning, and tornadoes. With this information, the controller can take preventative measures. If icing is expected, the airfoils should be fully or partially opened (e.g., to the 80% open position). This prevents the airfoils from freezing in the closed position.

FIG. 1 illustrates each airblade comprising one frame. In alternative embodiments of the invention (not illustrated), two or more frames may be connected side edge to side edge to form an effective longer horizontal frame. In other alternative embodiments (not illustrated), two or more frames may be connected top edge to bottom edge to form an effective taller vertical frame. Additionally, the two alternatives may be combined to form an effective longer and taller frame.

Figure 14:
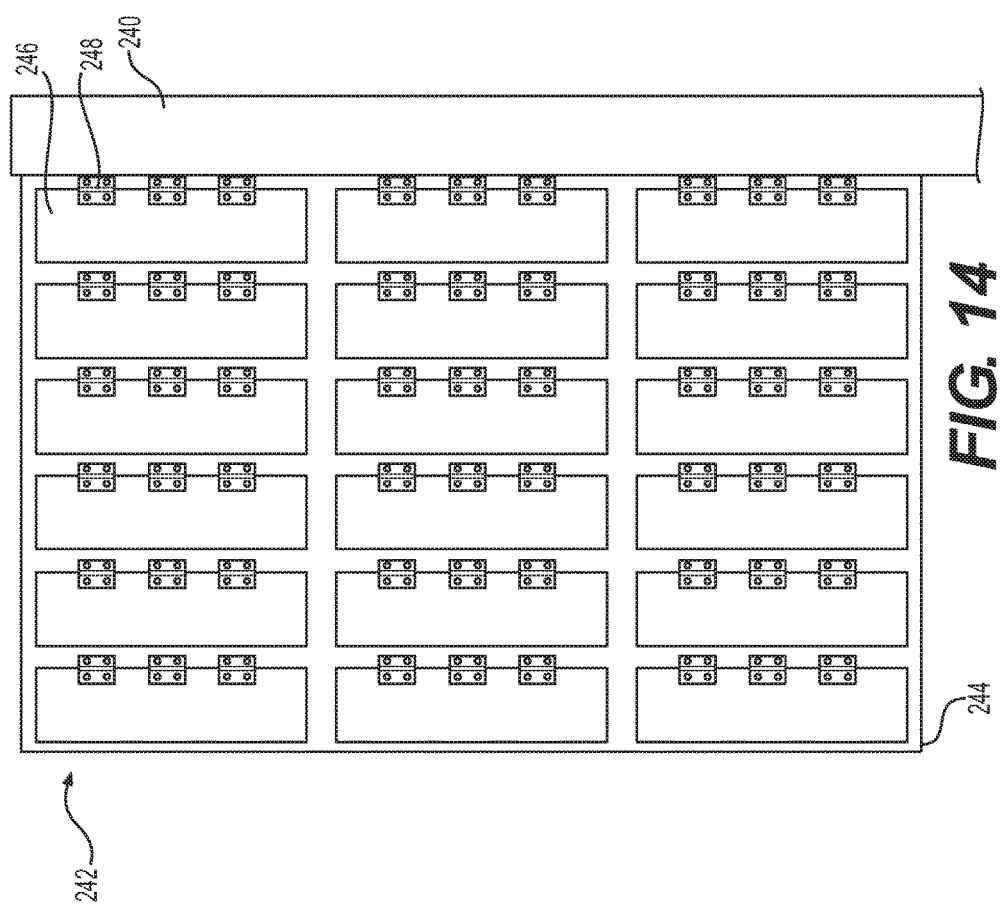
FIG. 14 is a front view of an airblade of a vertical axis windmill, in accordance with alternative embodiments of the present invention.

FIGS. 1-6 illustrate that each airfoil is hingedly affixed to its respective frame at a top edge of each airfoil. In alternative embodiments of the invention, each airfoil is hingedly affixed to its respective frame at a side edge of each airfoil. FIG. 14 illustrates an airblade 242 comprising a frame 244 affixed to a central axle 240. Each airfoil 246 in FIG. 14 is hingedly affixed to the frame 244 via hinges 248 at a proximal side edge. In alternative embodiments of the invention (not illustrated), the airfoils may be hingedly affixed to the frame at a distal side edge.

Figure 15:
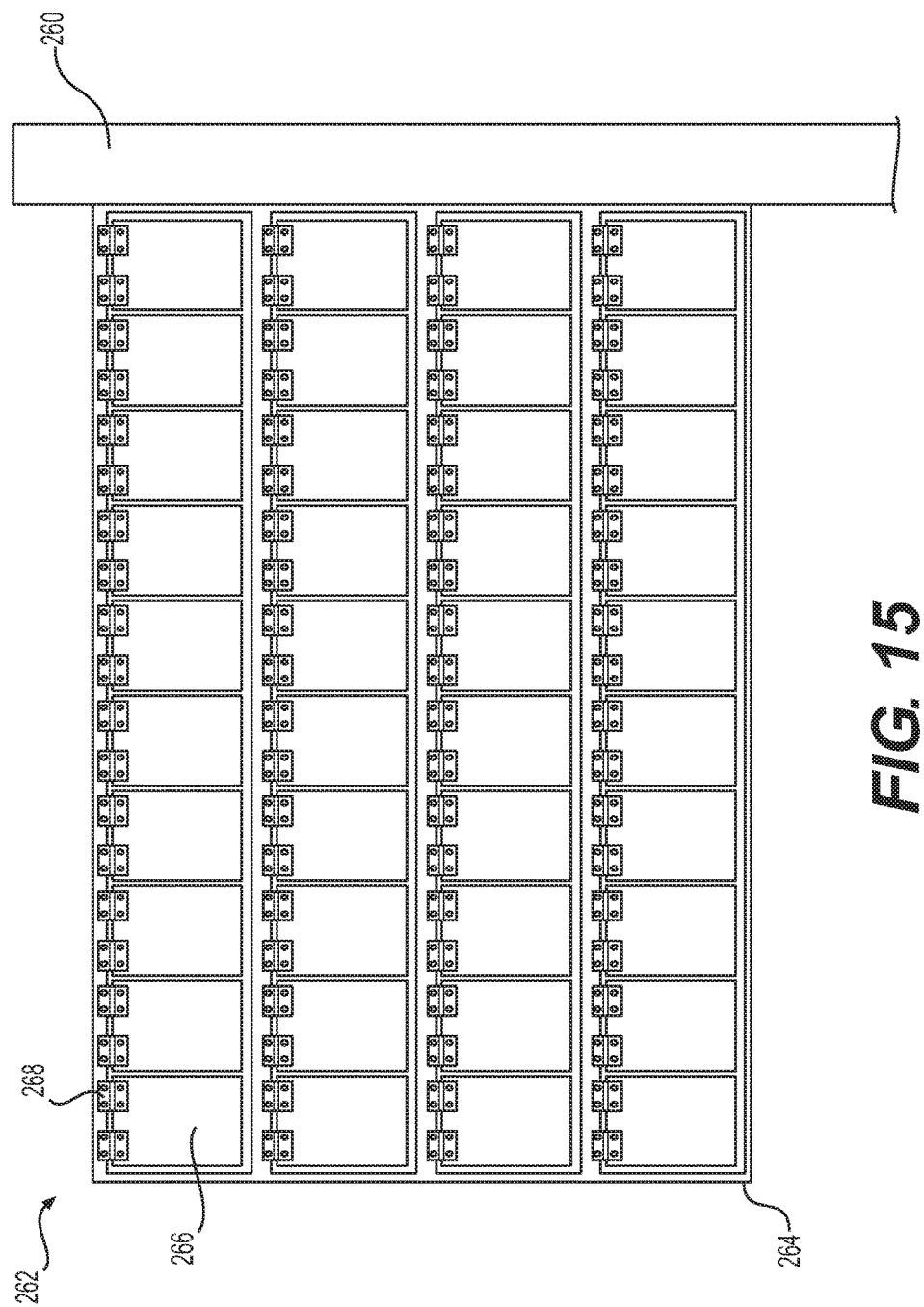
FIG. 15 is a front view of an airblade of a vertical axis windmill, in accordance with alternative embodiments of the present invention.

FIGS. 1-6 illustrate that each airfoil is hingedly affixed to its respective frame at a corresponding opening in the frame. In alternative embodiments of the invention, two or more airfoils may be affixed to their respective frame at a single corresponding opening. FIG. 15 illustrates an airblade 262 comprising a frame 264 affixed to a central axle 260. Each airfoil 266 in FIG. 15 is hingedly affixed to the frame 264 via hinges 268. Notably, the frame 264 defines four horizontally elongated openings. Ten airfoils 266 are affixed to the frame 264 at each of the openings.

FIGS. 1-6 indicate that the airfoils are aligned vertically and horizontally on each airblade. In alternative embodiments of the invention (not illustrated), multiple airfoils can be staggered (which may be termed a "running bond" pattern, like in a brick wall), in order to increase the strength of the airblade. In one example of such staggering, the bottom row comprises three 40-foot wide airfoils. The next row up starts with one 20-foot wide airfoil, then two 40-foot wide airfoils, and then one 20-foot wide airfoil. The next row up is again three 40-foot wide airfoils, and this pattern continues vertically.

The above-described structure and features of a vertical axis windmill of embodiments of the invention enable a windmill that is scalable in size, allowing for extremely large vertical axis windmills that are much easier to construct, operate, and maintain than extremely large horizontal axis wind turbines. A vertical axis windmill of embodiments of the invention can easily have airfoils that are 4 feet×8 feet in size or larger, with airblades that are 1000 feet long (or longer) and 100 feet tall (or taller). To reduce tipping tendencies, the windmill preferably should be four times, or greater, wider than it is tall. For example, a 100 foot tall windmill should have a minimum 400 foot diameter (i.e., a radius of 200 feet, which correlates to airblade length).

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

That which is claimed:

1. A vertical axis windmill comprising:
three or more frames rotatable in unison about a substantially vertical axis;
a plurality of airfoils hingedly affixed to each frame, each airfoil able to swing away from its respective frame in a first direction from a closed position to an open position and not able to swing away from its respective frame in a second direction from the closed position, the second direction being opposite the first direction; and
one or more counterbalance mechanisms, each counterbalance mechanism coupled to a corresponding one of the plurality of airfoils to reduce a force needed to swing the one or more of the plurality of airfoils from the closed position to the open position.

2. The windmill of claim 1, further comprising:
a central axle rotating in unison with the three or more frames.

3. The windmill of claim 2, wherein a proximal edge of each of the three or more frames is affixed to the central axle, the central axle forming the vertical axis.

4. The windmill of claim 3, further comprising:
a frame support affixed to a portion of a bottom edge of each of the three or more frames;
wherein the central axle extends through the frame support.

5. The windmill of claim 2, further comprising:
one or more electrical generators selectively engageable with the central axle to selectively generate electricity when the central axle rotates and/or one or more hydraulic pumps selectively engageable with the rotating central axle to selectively generate hydraulic pressure when the central axle rotates.

6. The windmill of claim 5, wherein the one or more electrical generators comprise two or more generators of different generating capacity and/or voltage types.

7. The windmill of claim 2, further comprising:
a stationary base supporting the central axle, the base comprising a circular perimeter wall; and
three or more horizontal rotatable support wheels, each wheel rotatably affixed to a support beam projecting downward from a respective one of the frames and contacting the stationary base perimeter wall such that the wheels rotate around the stationary base perimeter when the frames rotate.

8. The windmill of claim 2, further comprising:
a frame support affixed to a portion of a bottom edge of each of the three or more frames;
a stationary base supporting the central axle, the base comprising a circular perimeter wall; and
three or more horizontal rotatable support wheels, each wheel rotatably affixed to a support beam projecting downward from the frame support and contacting the stationary base perimeter wall such that the wheels rotate around the stationary base perimeter when the frames rotate.

9. The windmill of claim 1, wherein each airfoil is hingedly affixed to its respective frame at a top edge of each airfoil.

10. The windmill of claim 1, wherein each airfoil is hingedly affixed to its respective frame at a side edge of each airfoil.

11. The windmill of claim 1, further comprising:
one or more airfoil adjustable stops per frame, each of the one or more airfoil adjustable stops for limiting a respective one of the plurality of airfoils from reaching the closed position as the airfoil rotates away from the open position towards the closed position.

12. The windmill of claim 11, wherein the one or more airfoil adjustable stops are selectively variable such that a desired distance of the respective plurality of airfoils from the closed position is selectively variable, thereby forming a selectively variable opening.

13. The windmill of claim 11, wherein the airfoil adjustable stops comprise a plurality of airfoil adjustable stops that are controlled in unison.

14. The windmill of claim 1, wherein the one or more counterbalance mechanisms each comprise a counterbalance spring and/or a counterbalance weight and/or an electromagnet.

15. The windmill of claim 1, further comprising:
one or more substantially vertical rotatable wheels, each wheel rotatably affixed to a support beam projecting downward from a respective one of the frames and contacting a non-moving surface below the frames such that the one or more rotatable wheels rotate when the frames rotate.

16. The windmill of claim 15, further comprising:
one or more electrical generators, each of the one or more electrical generators selectively engageable with a corresponding one of the rotatable wheels to selectively generate electricity when engaged and when the corresponding one of the rotatable wheels rotates.

17. The windmill of claim 1, further comprising:
a frame support affixed to a portion of a bottom edge of each of the three or more frames; and
one or more substantially vertical rotatable wheels, each wheel rotatably affixed to a support beam projecting downward from the frame support and contacting a non-moving surface below the frames such that the one or more rotatable wheels rotate when the frames rotate.

18. The windmill of claim 17, further comprising:
one or more electrical generators, each of the one or more electrical generators selectively engageable with a corresponding one of the rotatable wheels to selectively generate electricity when engaged and when the corresponding one of the rotatable wheels rotates.

19. The windmill of claim 1, further comprising:
an elevated platform having an opening defined in a center thereof; and
a plurality of legs supporting the platform above a surface upon which the windmill sits;
wherein the platform is positioned such that a central axis of the windmill extends through the opening in the center of the platform.

20. The windmill of claim 19, wherein each of the plurality of legs are vertically adjustable.

21. The windmill of claim 20, wherein the elevated platform comprises two or more concentric circular tracks.

22. The windmill of claim 1, wherein each of the frames defines a plurality of openings;

wherein each of the plurality of airfoils is affixed to its respective frame at a corresponding one of the plurality of openings.

23. The windmill of claim 1, wherein each of the frames defines a plurality of openings;
wherein two or more of the plurality of airfoils are affixed to their respective frame at a corresponding one of the plurality of frame openings.

24. The windmill of claim 1, further comprising:
one or more support cables affixed to one frame and at least one other frame.

25. The windmill of claim 24, further comprising:
a rolling cable support comprising a support beam affixed to the one or more support cables and a wheel rotatably affixed to the support beam.

26. The windmill of claim 1, wherein the plurality of frames are spaced substantially equidistantly from each other.

* * * * *